United States Patent [19]

Thul

[11] Patent Number: 4,897,768

[45] Date of Patent: Jan. 30, 1990

[54] FLASHLIGHT HOLDER AND MOUNTED FLASHLIGHT

[76] Inventor: Andy J. Thul, 6914 Ann Arbor-Saline Rd., Saline, Mich. 48176

[21] Appl. No.: 315,846

[22] Filed: Feb. 27, 1989

[51] Int. Cl.$^4$ ............................................. F21L 15/20
[52] U.S. Cl. ................................... 362/191; 362/269; 362/287; 362/397; 362/398; 362/430
[58] Field of Search ............... 362/287, 190, 191, 269, 362/371, 382, 397, 398, 418, 427, 430

[56] References Cited

U.S. PATENT DOCUMENTS

| | | | |
|---|---|---|---|
| 1,344,073 | 6/1920 | Williams | 362/190 X |
| 2,674,428 | 4/1954 | Davis et al. | 362/191 X |
| 4,506,317 | 3/1985 | Duddy | 362/191 X |

Primary Examiner—Stephen F. Husar

[57] ABSTRACT

A flashlight holder and a mounted flashlight. The holder includes a support member having a pair of tracks and a pair of bases. The bases join and support the tracks. First and second followers are mounted on the respective tracks. The followers are selectively movable along the tracks. The flashlight holder includes a strap which has a first strap end and a second strap end. The first strap end is joined to the first follower. The strap is joined to the second follower between the strap ends. The strap, between the second follower and the second strap end, extends into the vicinity of the first follower. The strap is extendible between a first position, in which the strap loosely enwraps and defines an in which a flashlight can be loosely positioned and a second position, in which the strap tightly enwraps the body of the flashlight holding the flashlight in a desired position between the tracks and followers.

22 Claims, 3 Drawing Sheets

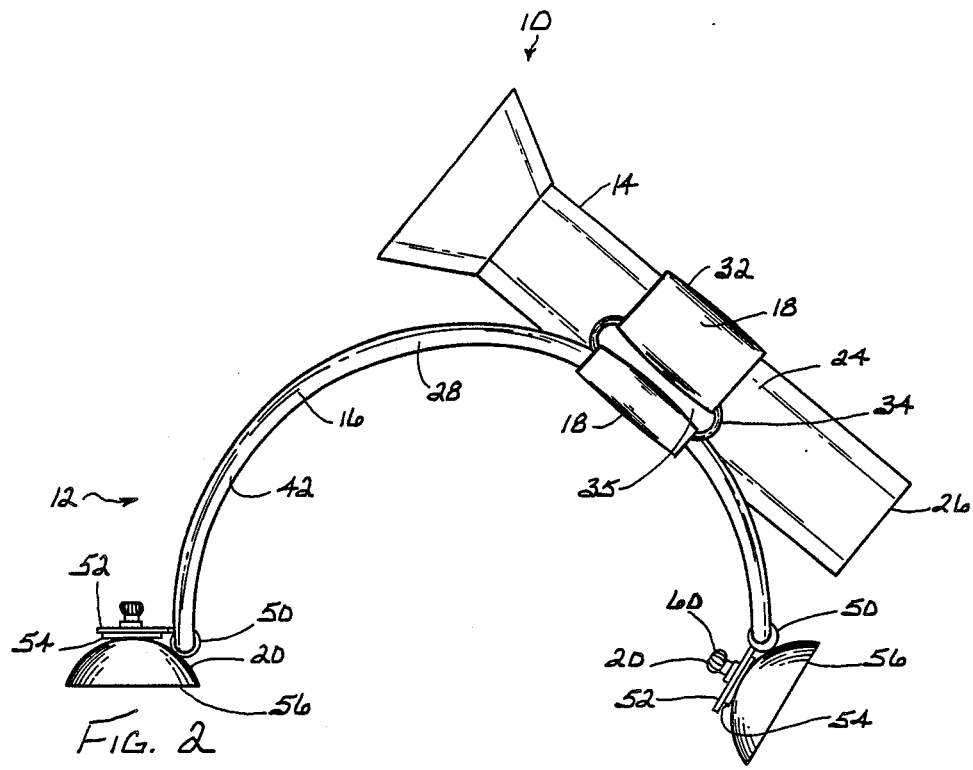
FIG. 2
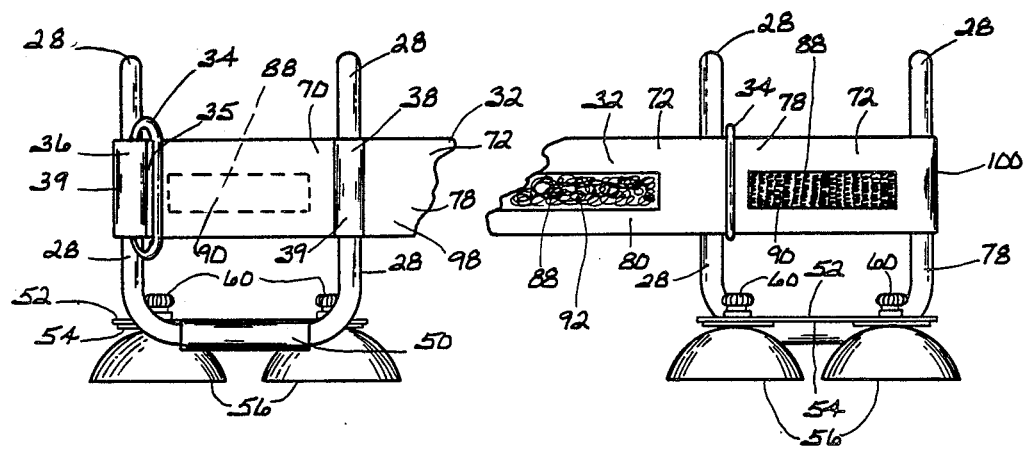
FIG. 3
FIG. 4

FLASHLIGHT HOLDER AND MOUNTED FLASHLIGHT

BACKGROUND OF THE INVENTION

The present invention pertains to holders for portable items and more particularly to a flashlight holder and to a mounted flashlight.

Portable lights have been made in a wide variety of shapes and sizes. The term "flashlight" is used herein to refer to a portable light which is cylindrical or roughly cylindrical in shape and has a bulb and reflector at one end. That end may or may not be enlarged. The cylindrical or roughly cylindrical shape of a flashlight, makes it easy to grasp and to place in a pocket or the like, but presents a shortcoming if a person needs to both illuminate an object with the flashlight and use both hands to manipulate the object. Numerous attempts to resolve this problem have been made, which present their own shortcomings.

A large variety of lights do exist which are not cylindrical or roughly cylindrical. Such portable lights will be referred to generally herein as "lanterns". Many lanterns have a shape, which have at least one flat side which permits the lantern to rest on supporting surfaces and be pointed in a chosen general direction. Since the exact direction to which the lantern points is limited by the surface upon which it rests it may be difficult to direct these lanterns toward where the light is needed. This shortcoming is often overcome by increasing the available light, which increases size and weight and reduces convenience. In other instances, the reflector and bulb might be repositioned to direct the light as needed by a mechanism contrived at the site of use. Such is not convenient, and sometimes the contrivance of such a mechanism is more difficult than the task to be accomplished.

Flashlight holders have heretofore been proposed. Some such holders have a magnet and frame attached in fixed relation to the flashlight. Flashlights mounted to such holders are useful where a large steel surface is available for the attachment of the flashlight. One shortcoming of these devices is that the positioning of the light beam is limited by inability to pivot the flashlight in relation to the surface to which it is attached. Other flashlight holders require specific mating parts on the flashlight and holder or other modifications of the flashlight. Other holders are not stable and are subject to spontaneous disassembly during use when used with smooth surfaced flashlights. Some mounted flashlights and holders which use suction cups for mounting the light on supporting surfaces have the shortcomings of either oversized suction cups or a large number of suction cups or an inadequate number suction cups to retain the holder or mounted flashlight in position.

It is therefore highly desirable to provide an improved flashlight holder and an improved mounted flashlight.

It is also highly desirable to provide an improved flashlight holder and an improved mounted flashlight by which a flashlight may be supported in a variety of orientations.

It is also highly desirable to provide an improved flashlight holder and an improved mounted flashlight, in which magnets or suction cups or other means may be used to attach the holder and mounted flashlight to a surface independently of each other.

It is also highly desirable to provide an improved flashlight holder and an improved mounted flashlight, from which a flashlight may be removed or joined quickly and easily, without modification of the flashlight, even if the flashlight has a smooth surface.

It is also highly desirable to provide an improved flashlight holder and an improved mounted flashlight, in which a large multi-cell flashlight can be supported and freely adjusted in position as desired.

It is finally highly desirable to provide an improved flashlight holder and an improved mounted flashlight which provide all of the above desired features.

SUMMARY OF THE INVENTION

It is an object of the invention to provide an improved flashlight holder and an improved mounted flashlight.

It is also an object of the invention to provide an improved flashlight holder and an improved mounted flashlight by which a flashlight may be supported in a variety of orientations.

It is also an object of the invention to provide an improved flashlight holder and an improved mounted flashlight, in which magnets or suction cups or other means may be used to attach the holder and mounted flashlight to a surface independently of each other.

It is also an object of the invention to provide an improved flashlight holder and an improved mounted flashlight, from which a flashlight may be removed or joined quickly and easily, without modification of the flashlight, even if the flashlight has a smooth surface.

It is also an object of the invention to provide an improved flashlight holder and an improved mounted flashlight, in which a large multi-cell flashlight can be supported and freely adjusted in position as desired.

It is finally an object of the invention to provide an improved flashlight holder and an improved mounted flashlight which provide all of the above desired features.

In the broader aspects of the invention there is provided a flashlight holder and a mounted flashlight. The flashlight holder includes a support member having a pair of tracks and a pair of bases. The bases join and support the tracks. First and second followers are mounted on the respective tracks. The followers are selectively movable along the tracks. The flashlight holder includes a strap which has a first strap end and a second strap end. The first strap end is joined to the first follower. The strap is joined to the second follower between the strap ends. The strap between the second follower and the second strap end, extends into the vicinity of the first follower. The strap is extendible between a first position, in which the strap loosely enwraps and defines an opening in which a flashlight can be loosely positioned and a second position, in which the strap tightly enwraps the body of the flashlight holding the flashlight in a desired position between the tracks and followers.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein:

FIG. 2 is a side plan view of an alternative embodiment of the mounted flashlight of the invention, which includes an embodiment of the holder of FIG. 1 with magnets FIG. 3 is a back plan view of the holder of FIGS. 1 and 2 with the strap of the holder shown disassembled and part of the strap deleted for clarity.

FIG. 4 is a front plan view of the holder of FIG. 3 with the strap shown partially assembled and part of the strap deleted for clarity.

DESCRIPTION OF A SPECIFIC EMBODIMENT

Figure 1:
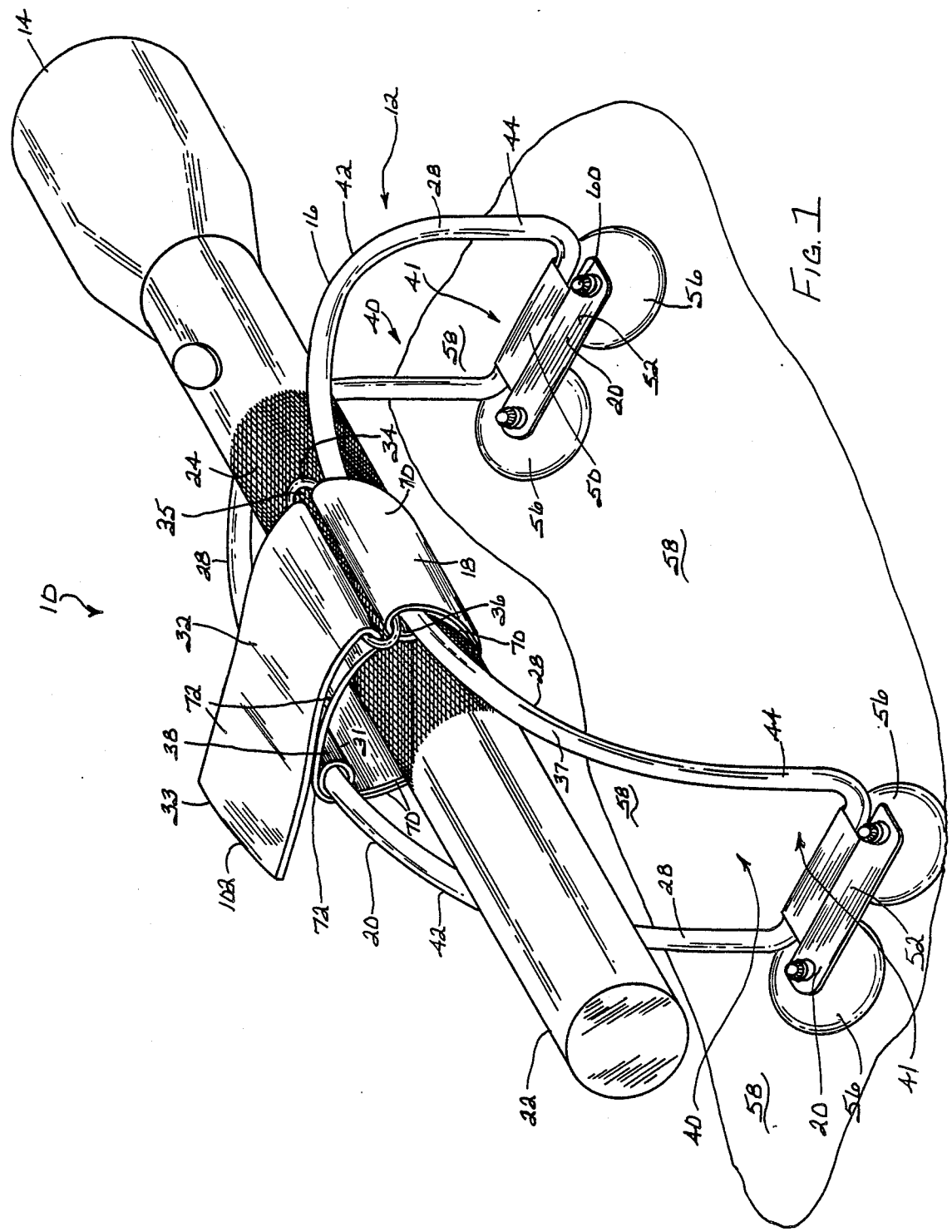
FIG. 1 is an isometric view of an embodiment of the mounted flashlight of the invention, which includes an embodiment of the holder of the invention with suction cups.
Figure 5:
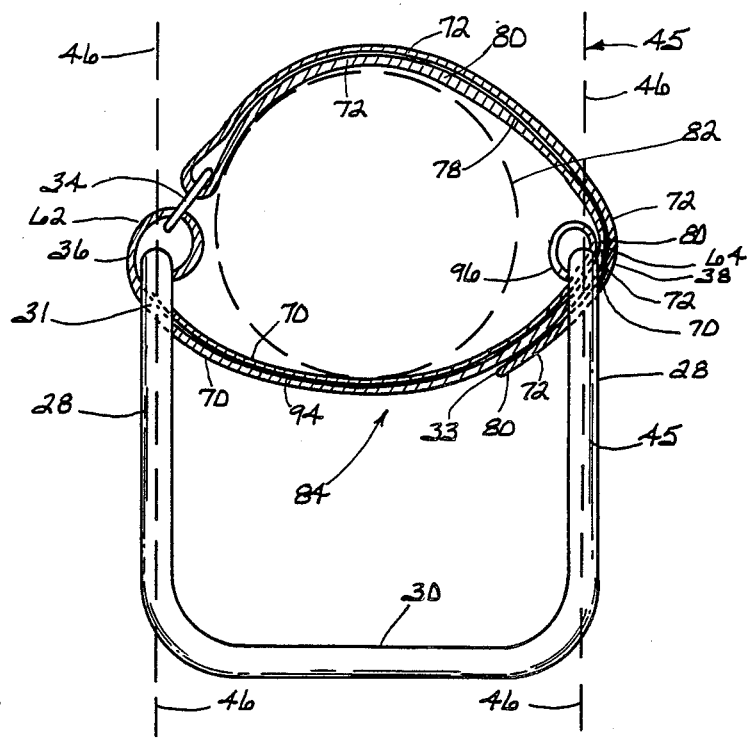
FIG. 5 is a back plan view of the holder of FIG. 3 in which the attachment plates are deleted for clarity, the strap is shown in a first configuration loosely encircling an opening for a flashlight, indicated in dashed lines, and the planes defined by the tracks are indicated by dashed lines.
Figure 6:
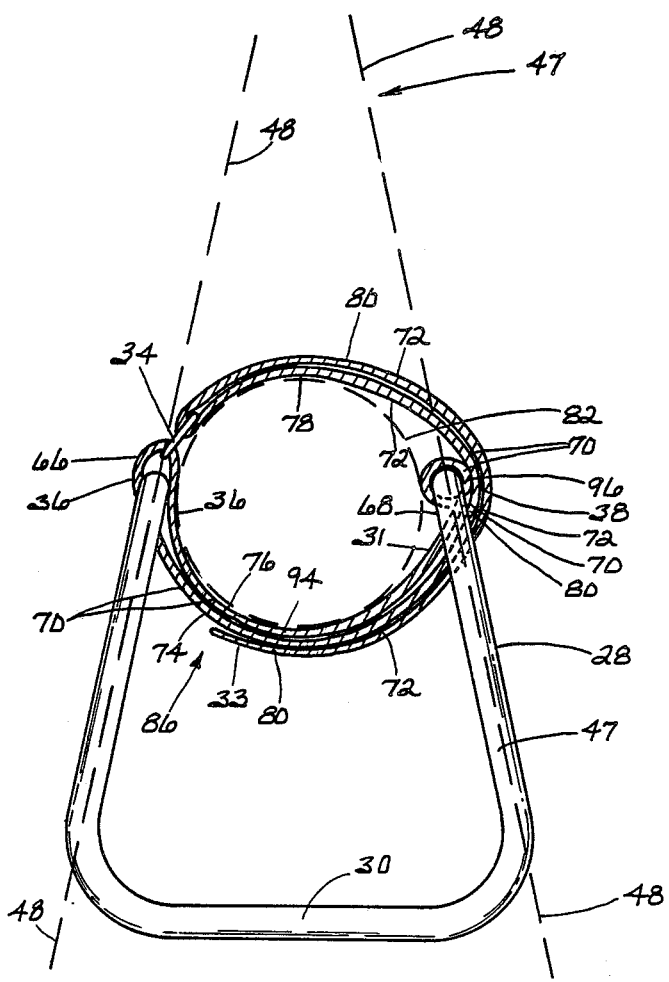
FIG. 6 is a view similar to FIG. 5 showing the strap in a second configuration.

The mounted flashlight 10 of the invention has a flashlight holder 12 of the invention and a flashlight 14. Flashlight holder 12 has a support member 16, a strap member 18 slidably positioned thereon, and one or more attachment plates 20 connected at the ends thereof. Support member 16 in the specific embodiment shown is integral and has a pair of track portions 28 and one or more base portions 30. Strap member 18 includes a strap 32, a retainer or bail 34, a first follower 36, and a second follower 38.

Flashlights 14, useful with holder 12, may vary. For example, flashlight 22 shown in FIG. 1 is a multi-cell flashlight which has a textured grip portion 24. Flashlight 26 shown in FIG. 2 is a two-cell unit, which has a smooth grip portion 24. Flashlight holder 12 may be sized to fit flashlights 14 having grip portions 24 within a particular range of circumferences. In a specific embodiment, flashlight holder 12 may be sized to accomodate, at a minimum, flashlights 14 having barrels of the same approximate circumference as a particular battery, for example, a size "D" battery. The length of flashlight 14 may be varied as desired. Flashlight holder 12 is not limited to use with flashlights 14 but may be used with other cylindrical or roughly cylindrical objects (not shown) and may be sized to accomodate a particular object or series of objects. Good contact is necessary between barrel grip portion 24 of flashlight 14 and strap member 18 of flashlight holder 12.

Characteristics of flashlight 14 which, either do not change or increase that contact, for example, texturing as shown in FIG. 1, are acceptable or even desirable. Characteristics of flashlight 14 which detract from contact, such as, major departures of grip portion 24 from a cylindrical shape, are undesirable and render more difficult or even prohibit use of flashlight holder 12. Minor departures in shape can be accomodated by holder 16 without too great a decrease in the ability of holder 16 to hold flashlight 14. Some departures from a cylinderical shape may also be accomodated by modification of flashlight holder 12, for example, by inclusion of a compressible interspacer (not shown) between flashlight 14 and strap 18.

Track portions 28 of support member 16 are spaced apart from each other and joined together by one or more base portions 30. Track portions 28 define between themselves a path 40 which has termini 41 at the respective base portions 30. Track portions 28 and path 40 may have a variety of shapes, such as linear or convoluted, however, it is desirable that track portions 28 and path 40 arch upward from base portions 30.

In the embodiment of the invention illustrated, track portions 28 each have an upper accurate track section 42 (which in a specific embodiment is curved in the shape of a semi-circle) and a pair of lower track sections 44, which are linear and each adjoin upper track section 42 at the opposite ends thereof. The uniformly curving upper track sections 42 allow for easy pivoting of flashlight 14 to any desired angle. Straight lower track sections 44 make it easy to position flashlight 14 at the two specific angles corresponding to the strap member 18 being positioned on track sections 44 and, in addition, add vertical relief to upper track section 42 to help accomodate large flashlights 14.

In the specific embodiment of the invention illustrated, support member 16 is a unitary, deformed endless loop of rod having a circular or rounded cross-section. A suitable material for support member 16 in a specific embodiment is, for example, a plated spring steel rod.

Base portions 30 extend transverse to track portions 28. In other embodiments of the invention, (not shown), support member 16 is not unitary and base portions 30 are one or more separate pieces joining discrete track portions 28. In still other embodiments of the invention (not shown), track portions 28 are part of one or more larger structures to which track portions 28 are permanently fixed.

In the specific embodiment of the invention illustrated, followers 36, 38 are portions of strap member 18 which encircle respective track portions 28. In other specific embodiments of the invention (not shown) follower 36 is a tubular member having a cross-section shaped complimentary of rails 28 attached at one end to strap member 18.

Track portions 28 are resiliently deflectable from an unconstrained position 45, in which track portions 28 define a pair of generally parallel planes 46, to a constrained position 47, in which track portions 28 define a pair of convergent or divergent planes 48, depending upon the size of grip portion 24 of flashlight 14.

In embodiments of the invention in which track portions 28 and support member 16 is a unitary, deformed endless loop, support member 16, as a result of its shape and the spring steel of which it is made, is substantially resistant to flexing except for the above described resilient deflection between unconstrained position 45 and constrained position 47. Flexing of flashlight holder 12, except for resilient flexion between unconstrained and constrained positions 45, 47 respectively, is undesirable.

Attachment plates 20 are either rigidly joined to base portions 30 or more desirably, pivotably connected by, for example, shackles 50. In particular embodiments of the invention, one or both faces 52, 54 may include means for attachment to a supporting surface 58, such as one or more suction cups or magnets 56. In FIGS. 1 and 2 only face 54 has suction cups or magnets 56. Face 52 has fasteners 60 for suction cups 56.

In the specific embodiment of the invention illustrated, attachment plates 20 are freely pivotable about base portions 30 such that both attachment plates 20 have the same "handedness" relative to their respective base portions 30. Stated in another way, when attachment plates 20 are rotated equally, in the same direction of rotation, about their respective base portions 30, both attachment plates 20 define either the same plane or parallel planes. In FIG. 1, attachment plates 20 are each rotated to the same extent and in the same direction about respective base portions 30 and both attachment plates 20 define the same plane, that of surface 58. Attachment plates 20, are independently pivotable, thus flashlight holder 12 and mounted flashlight 10 may be attached to a surface 58 which is curved or stepped or of some other complex shape without limitation.

In particular embodiments of the invention, attachment plates 20 are subtantially identical and freely pivotable, in order to pivot to substantially identical angles relative to base portions 30, when holder 12 is lifted vertically. This aids in attaching holder 12 to a surface 58 with one hand, in that attachment plates 20 may be attached to surface 58 by moving holder 12 downwardly toward a surface 58 and either forward or backward along a line joining base portions 30 (not shown). Such motion will pivot both attachment plates 20 into correct orientations on surface 58 at the same time to conform to the particular shape of surface 58.

In embodiments of the invention in which attachment plates 20 are pivotable, each attachment plate 20 may be attached to surface 58 individually, one after the other. This is advantageous where multiple suction cups 56 are used on each attachment plate 20, since it is usually difficult to attach a large number of suction cups at the same time.

Followers 36, 38 are selectively movable along respective track portions 28, in order to move strap member 18 along path 40 between termini 41. In embodiments of the invention in which track portions 28 are arcuate or otherwise not uniform or linear, followers 36, 38 are flexible bands encircling track portions 28; followers 36, 38 are deformable between a nonrestraining configurations 62, 64, respectively, and restraining configurations 66, 68, respectively. In nonrestraining configurations 62, 64; followers 36, 38, respectively, slide freely along respective track portions 28, so that strap member 18 may be moved by the user as necessary. In restraining configurations 66, 68, followers 36, 38 grip track portions 28, and strap member 18 is immobile along track portions 28 by the weight of flashlight 14 so that flashlight 14 can be selectively positioned and will remain in that position.

Bail or retainer 34 is joined to first follower 36. In particular embodiments of the invention, bail 34 is a rigid loop or link which is pivotable, or more desirably, freely pivotable or movable, about first follower 36. Bail 34 provides a site about which strap 32 can double back, and thus the configuration of bail 34 varies to accomodate the width of strap 32 in different embodiments of the invention.

Strap 32 has a primary portion 70 and a secondary portion 72. Primary portion 70 extends from first follower 36 to second follower 38. In particular embodiments of the invention, followers 36, 38 are affixed to the opposite ends 71 of primary portion 70 of strap 32 and are not removable.

In the specific embodiment of the invention illustrated, to provide greater strength and simplicity, strap 32 is made from a single length of material, bent into a loop at one end to form second follower 38. The material extends outwardly from second follower 38 to form underlayer 76, then loops again, forming first follower 36 and extends back toward second follower 38, forming overlayer 74 of primary portion 70. Overlayer 74 is superposed on underlayer 76 throughout its length between first 36 and second 38 followers and in a specific embodiment may be bound together by sewing or glue or the like. Secondary portion 72 of strap 32 continues out from the end of overlayer 74 and from second follower 38. Secondary portion 72 extends through gap 35 of bail 34 and back along itself defining an inner secondary portion 78 and an outer secondary portion 80. Inner secondary portion 78 extends from second follower 38 and primary portion 70 to bail 34. Outer secondary portion 80 extends from bail 34 back over and overlapping inner secondary portion 78 to and overlapping second follower 38 and at least partially overlapping primary portion 70. In alternative embodiments of the invention, the amounts of overlap by outer secondary portion 80 differ.

In other particular embodiments of the invention, the length of primary portion 70 is fixed, as is the length of secondary portion 72, and secondary portion 74 is movable through gap 35 around bail 34, to vary the lengths of inner secondary portion 78 and outer secondary portion 80. This insures that flashlight 14 will be gripped between tracks 28 when strap is secured in its second position 86.

In another specific embodiment, the length of primary portions 70, 72 are not fixed and strap 32 may be pulled through bail 30 to shorten portion 70 and lengthen portion 72 or to lengthen portion 70 and shorten portion 72.

Strap 32 may be selectively moved between a first position 84 in which strap 32 loosely enwraps an opening 82 sized to receive a flashlight 14, and a second position 86 in which strap 32 tightly enwraps opening 82. A cylindrical object such as a flashlight 14 may be inserted into opening 82 when strap 32 is in first position 84. That object or flashlight 14 is tightly gripped when strap 32 is in second position 86.

In both embodiments of the invention in which layers 74 and 76 are secured together and unsecured, movement of secondary portion 72 of strap 32 through bail 34 not only alters the length of inner secondary portion 78, but also urges tracks 28 together to grip flashlight 14. In these embodiments, primary portion 70 of strap 32 has an unwrapped section 94 and a wrapped section 96. When strap 32 is in first position 84, primary portion 70 consists entirely of unwrapped section 94. When strap 32 is moved to second position 86, the movement of inner secondary portion 78 causes second follower 38 to rotate about its respective track portion 28 and to form a wrapped section 96, of primary portion 70, wrapped about second follower 38. This decreases the length of unwrapped section 94, further tightening strap 32 about flashlight 14 or another object in opening 82 and urges track portions 28 together.

Fasteners 90, 92 are provided to retain strap 32 in its second position 86. In particular embodiments of the invention, fasteners 90, 92 arrest the movement of strap 32 around bail 34 and allows for a variable overlap by outer secondary portion 80, so that holder 12 can accomodate flashlights 14 of varying diameters. A variety of fasteners 90, 92 may be employed to arrest movement of secondary portion 72 of strap 32, however, a convenient means is a hook and eye fastener tape, such as that marketed under the trademark VELCRO. In particular embodiments of the invention, the hook and eye fastener tape 88 has hook subunits and eye subunits which are affixed to strap 32 at 90 and 92. The subunits 90, 92 may be joined to each other in a plurality of different overlaps.

In operation, flashlight holder 12 may be attached to surface 58 before or after flashlight 14 is placed within holder 12. Flashlight holder 12 or mounted flashlight 10 may be placed in any orientation on surface 58, such as, vertically, horizontally, or dependent from surface 58. In installing flashlight 14 within flashlight holder 12, strap member 18 is first moved to a desired location on track portions 28 and, with strap 32 in first position 84, flashlight 14 is positioned as desired. Strap 32 is then moved to second position 86 to grip flashlight 14 between track portions 28 and within opening 82. This does not appreciablely disturb the aim of flashlight 14.

If flashlight 14 has a grip portion 24 which is appropriately sized for flashlight holder 12, but cannot be slid into opening 82 when strap 32 is in first position 84 due to other size constraints; strap member 18 may be opened to open position 98 illustrated in FIG. 3. In open position 98, secondary portion 72 of strap 32 extends out from second follower 38 and not through gap 35. Flashlight 14 may then be placed in opening 82 and secondary portion 72 brought over flashlight 14 and through gap 35. This leaves strap member 18 in partially opened position 100, as illustrated in FIG. 4. Outer secondary portion 80 may then be brought across inner secondary portion 78 placing strap member 18 in partially closed position 102, as illustrated in FIG. 1. Outer secondary portion 80 may then be overlapped to place strap 32 in first position 84 and final adjustments in the position of flashlight 14 may be now made. Finally, strap portion 32 can be moved into its second position 86 firmly gripping flashlight 14 in opening 82 between track portions 28 and moving track portions 28 from their unconstrained position 45 to their constrained position 47 and held therein by fasteners 90, 92.

A procedure for removing flashlight 14 is the reverse of the above process.

The invention provides an improved flashlight holder and an improved mounted flashlight by which the flashlight may be supported in a variety of orientations. The improved flashlight holder and improved mounted flashlight utilizes either magnets or suction cups or other means to attach the holder and mounted flashlight to a surface independently of each other from which a flashlight may be removed or joined quickly and easily without modification of the flashlight, even if the flashlight has a smooth barrel or gripping surface. The improved flashlight holder and improved mounted flashlight of the invention can either use a small two cell flashlight or a large multi-celled flashlight as desired.

While there has been described above the principles of this invention in connection with specific apparatus it is to be clearly understood that this description is only made by way of example and not as a limitation to the scope of the invention.

What is claimed is:

1. A flashlight holder comprising a support member having a pair of spaced tracks and at least one base, said bases joining said tracks, a strap extending between and enwrapping said tracks, said strap being selectively loosened or tightened whereby a flashlight can be positioned between said tracks and held between said tracks and selectively adjusted in position.

2. The flashlight holder of claim 1 further comprising first and second followers mounted on respective ones of said tracks, said followers being selectively movable along said tracks; a strap having a first strap end and a second strap end, said first strap end being secured to said first follower, said second follower being secured to said strap between said strap ends, said strap between said second follower and said second strap end extending over said first follower, said strap being movable between a first position wherein said strap loosely enwraps an opening and a second position wherein said strap tightly enwraps said opening, and means for arresting movement of said strap.

3. The flashlight holder of claim 1 wherein said strap is resiliently tensioned in said second position.

4. The flashlight holder of claim 1 further comprising a bail joined to said first follower, said bail having a gap, and wherein said strap extends through said gap.

5. The flashlight holder of claim 4 wherein said strap has a primary portion and a secondary portion, said primary portion extending from said first follower to said second follower, said secondary portion having an inner secondary portion and an outer secondary portion, said inner secondary portion extending from said primary portion to said bail, said outer secondary portion extending from said bail to said strap end, said secondary portion overlapping said inner secondary portion and said first follower, and wherein said movement of said strap between said first position and said second postion alters the relative lengths of said inner secondary portion and said outer secondary portion.

6. The flashlight holder of claim 2 wherein said followers are each reversibly deformable between a nonrestraining configuration, and a restraining configuration; said followers being slidable along said respective tracks, said followers grip said respective tracks by movement of said strap between said first position and said second position.

7. The flashlight holder of claim 2 wherein said tracks are resiliently deflectable from an unconstrained position to a constrained position by movement of said strap from said first position to said second position.

8. The flashlight holder of claim 7 wherein said support member is unitary and resistant to flexion and wherein said support member is least resistant to flexion due to said resilient deflection of said tracks from said unconstrained position to said constrained position.

9. The flashlight holder of claim 7 wherein said tracks define, in said unconstrained position, a pair of parallel planes and define, in said constrained position, a pair of intersecting planes.

10. The flashlight holder of claim 1 further comprising one or more attachment members joined to one or more of said base portions.

11. The flashlight holder of claim 10 wherein said attachment members are pivotably joined to said base members.

12. The flashlight holder of claim 10 wherein said attachment members are each offset in the same direction from respective ones of said base members when said attachment members are coplanar.

13. The flashlight holder of claim 2 wherein said strap is affixed to said second follower and wherein movement of said strap between said first position and said second position pivots said second follower about its respective one of said tracks to alter the size of said opening.

14. The flashlight holder of claim 2 wherein said followers are each reversibly deformable between a nonrestraining configuration wherein each of said followers are slideable along its respective one of said tracks, and a restraining configuration wherein each of said followers grip its respective one of said tracks by movement of said strap between said first position and said second position, and wherein said tracks are resiliently deflectible from an unconstrained position to a constrained position by movement of said strap from said first position to said second position.

15. The flashlight holder of claim 2 wherein the length of said strap between said followers is greater than the separation of said tracks in said unconstrained position.

16. A holder for a flashlight-shaped object, said holder comprising a support member having a pair of tracks and a pair of bases, said tracks defining a continuous and upward arching path between said tracks, said bases defining first and second spaced termini of said path, said bases each extending transversely between said tracks below said path, first and second followers, each of said followers being slideably mounted to a respective one of said tracks, said followers being alternately freely movable along said tracks and tightenable into immobility against said tracks, a bail pivotably mounted to said first follower, a strap having a primary portion and a secondary portion, said primary portion having a pair of opposed ends, each said end being secured to a respective one of said followers, said secondary portion being connected to said primary portion adjacent to said second follower, said secondary portion having an inner secondary portion and an outer secondary portion, said inner secondary portion extending between said first follower and said bail, said outer secondary portion extending from said bail and at least partially overlapping said inner secondary portion, said strap being slideable relative to said bail to vary the length of said inner secondary portion to loosen and tighten said strap, and means for arresting sliding of said strap under said bail.

17. The flashlight holder of claim 16 wherein said track portions are curved rails having a rounded cross-section.

18. The flashlight holder of claim 17 wherein said followers are flexible bands loosely encircling said track portions and wherein said followers are unitary with said strap.

19. The flashlight holder of claim 16 wherein the length of said primary portion of said strap is greater than the maximum separation of said followers.

20. The flashlight holder of claim 16 wherein said outer secondary portion completely overlaps said inner secondary portion and said second follower.

21. The flashlight holder of claim 16 wherein said means for arresting sliding further comprises a substantially planar fastener having two detachably joinable subunits, said subunits being attached to said outer secondary portion and said primary portion, respectively.

22. A mounted flashlight comprising a flashlight holder including a support member having a pair of track portions, said track portions being spaced apart from each other, a flashlight between said track portions, a strap member having a first follower, a second follower, a bail, and a strap, said followers each encircling a respective one of said track portions said bail being pivotably mounted to said first follower, said strap being secured to said first follower and to said second follower, said strap extending from said first follower to said second follower, said strap extending from said second follower around said flashlight and through said bail and overlapping back over said second follower, said strap being slideable through said bail to move said strap between a first position, wherein said strap loosely enwraps said flashlight and tracks and said followers slideably engage respective said track portions, and a second position wherein said strap tightly enwraps said flashlight and tracks and said followers grip said track portions, and a fastener having a pair of detachably connected subunits, said subunits being fastened to said strap to connect said overlapping portions.

* * * * *